Feb. 7, 1961  G. HERR  2,970,863
SUN-VISOR, PARTICULARLY FOR MOTOR-VEHICLES
Filed Feb. 25, 1958  2 Sheets-Sheet 1

INVENTOR.
Gerhard Herr
BY Ernest G. Montague
Attorney

Feb. 7, 1961 G. HERR 2,970,863
SUN-VISOR, PARTICULARLY FOR MOTOR-VEHICLES
Filed Feb. 25, 1958 2 Sheets-Sheet 2

INVENTOR.
Gerhard Herr
BY Ernest G Montague
Attorney

United States Patent Office 2,970,863
Patented Feb. 7, 1961

2,970,863

SUN-VISOR, PARTICULARLY FOR MOTOR-VEHICLES

Gerhard Herr, Wuppertal-Vohwinkel, Germany, assignor to Firma Gebr. Happich G.m.b.H., Wuppertal-Elberfeld, Germany, a corporation of Germany Filed Feb. 25, 1958, Ser. No. 717,475

Claims priority, application Germany Mar. 2, 1957

4 Claims. (Cl. 296—97)

The present invention relates to a sun visor, particularly for motor vehicles, and in particular to a sun visor disposed inside of a motor vehicle and secured thereto with a carrying rod, the sun visor comprising a visor sheet of elastic compressible and porous cushioning material and having a pocket-like closed cover which is elastically spread apart and partly surrounds the carrying rod.

It is known to form sun visors of a pocket of air-tight material which is filled with cushioning material for the purpose to protect the riders in the car against injuries, and particularly to prevent the driver from hitting his head against the windshield. In these cushions, the resistance against the hitting force does not only depend upon the cushioning effect, but also upon the compression of the air present in the hollow spaces of the cushion, which cannot escape and is subject to high pressure. A counter-force is experienced which easily leads to blows and injuries.

It has also been proposed before to produce the bag of these sun visors of a sheet of artificial material. In this connection, it is of advantage to use pliable and thin sheets which are not reinforced by a textile lining. Yet, in using such thin sheets, the danger is brought about that they break due to the high pressure in the case of subjecting the same to blows.

It is, therefore, one object of the present invention to provide a sun visor which forms a cushion with an increased cushioning effect the receiving effect of which is determined, however, upon reaching a predetermined cushion resistance by the cushioning material only.

It is another object of the present invention to provide a sun visor which has an air-tight cover sheet which surrounds the air filled inner space in order to increase the cushioning effect and which is equipped with a valve opening for the throttled escape of air from the inside of the sun visor, where the throttling point is disposed at the point of penetration of the carrying rod into the sun visor.

Due to this arrangement, the particularly advantageous effect is brought about that the air present in the sun visor escapes through the valve upon receiving a blow. The resistance of the cushion is thereby increased free of any rebound and without reaching the breaking point for the cover sheet. By this arrangement, head injuries, for instance a blow and the occurrence of local wounds are avoided.

It is still another object of the present invention to provide a sun visor wherein the valve opening for the throttled escape of air is formed as an annular slot at the point of penetration of the carrying rod into the sun visor, which slot is defined on the one hand by the opening edge of the cover sheet and on the other hand by the outer surface of the carrying rod, in order to bring about an equal, smooth outer appearance of the sun visor and in order not to impair the ornamental appearance of the formation of the throttled valve opening and finally also in order not to create artificial escape openings for the air.

In order to achieve that the edges are properly turned outside and engage intimately the carrying rod, the edge of the opening of the sheet of artificial material which forms the bag is formed as an annular lip which surrounds ring-like the outer surface of the carrying rod, the edge of the opening surrounding the point of penetration of the carrying rod.

It is particularly advantageous that the securing of the throttling slot against damage during use of the sun visor is brought about, without interference with the proper operation of the sun visor, by providing an escape space for the lip between a closing cap, disposed or mounted on the cover sheet of the cushion and arranged on the carrying rod and secured to the bearing of the sun visor, on the one hand, and the lip, on the other hand.

With these and other objects in view which will become apparent in the following detailed description, the present invention will be clearly understood in connection with the accompanying drawings, in which.

Figure 1:
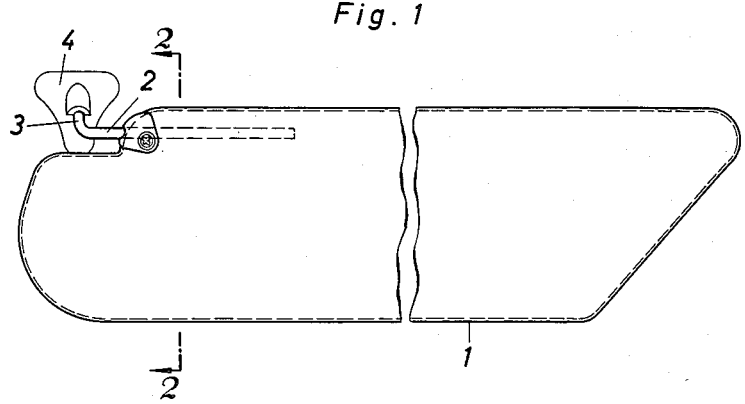
Figure 1 is a front elevation of the sun-visor.
Figure 2:
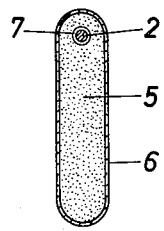
Fig. 2 is a cross section along the lines 2—2 of Fig. 1.

Refering now to the drawing, the sun-visor comprises an elastic or elastically upholstered visor body 1, which is supported by a carrying rod 2. The latter is mounted, preferably swingably, in a bracket 4 with its free end 3, which bracket 4 is secured to the wall of the vehicle body.

The visor body 1 comprises a bag filled with upholstery material 5 and made of air-tight material. At the set-off upper corner of the visor body 1, the carrying rod 2 enters into the bag, where the latter is connected with the visor body 1.

Figure 3:
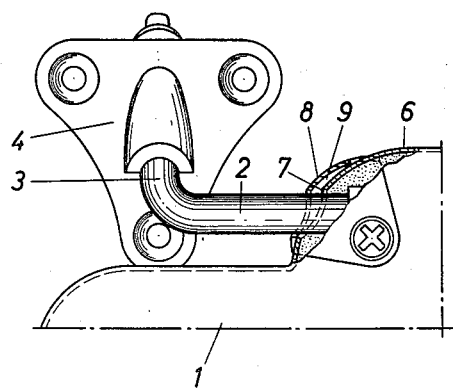
Fig. 3 is a fragmentary front elevation of the sun-visor, partly in section, at enlarged scale, indicating one escape opening in the sun-visor.

As shown in Fig. 3, the penetrating point of the carrying rod 2 through the wall 6 of the bag is formed as a throttle slot 7, whereby the edge of the opening, which surrounds the penetrating point of the carrying rod 2, engages lip-like the periphery of the carrying rod 2 (Fig. 3).

A closing cap 8 is set over the penetrating point. A yielding space 9 is provided for the lip between the closing cap 8, slid over the carrying rod 2 and secured to the visor 1, on the one hand, and the lip, on the other hand.

Figure 4:
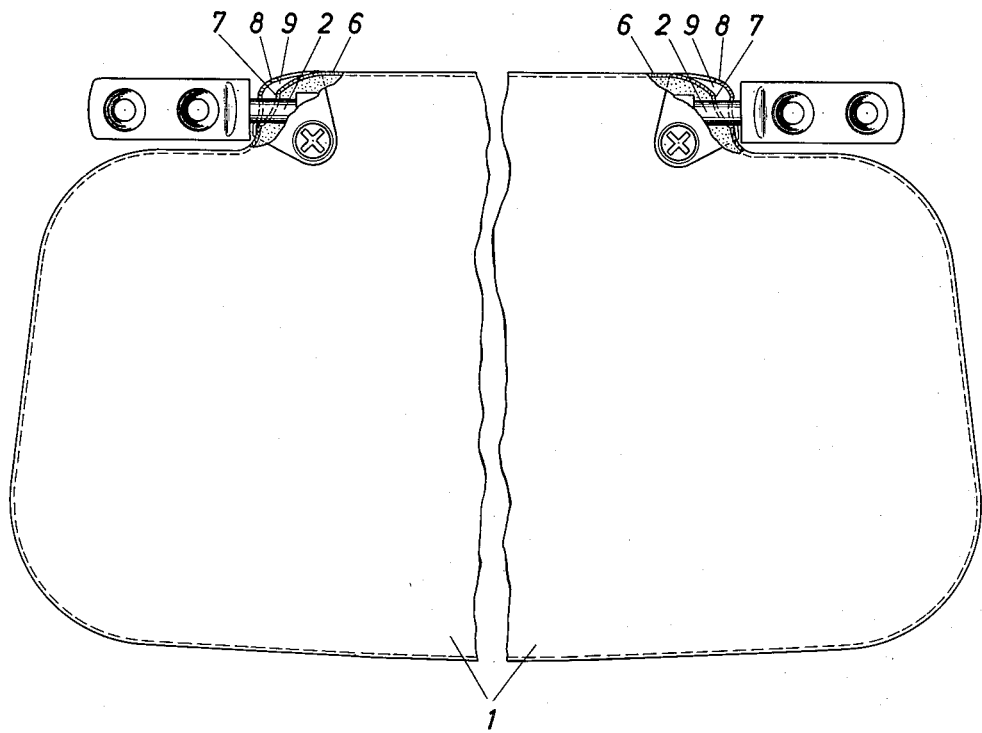
Fig. 4 is a front elevation of the sun-visor showing a double mounting thereof.

It is within the scope of the present invention to provide the sun-visor with a double mounting, as disclosed in Fig. 4. In this case suitably both upper corners are equipped with a throttled escape opening. The visor may, however, be equipped also with a center bearing or in a different manner rotatable, foldable and/or swingable. In each case, the carrying rod 2 and the bag opening receiving the latter is formed in the described manner.

While I have disclosed one embodiment of the present invention, it is to be understood that this embodiment is given by example only and not in a limiting sense, the scope of the present invention being determined by the objects and the claims.

I claim:

1. A sun visor for motor vehicles comprising a cover of pliable, airtight sheet material and an elastic cushioning material having open, air-filled pores disposed in said cover, said cover forming jointly with said cushioning material a pillow-like body, and at least one carrying rod entering one corner of and supporting said sun visor, and the edge portion of said cover forming at the entrance point of said carying rod with the outer face of the latter a throttle opening.

2. The sun visor, as set forth in claim 1, wherein a carrying rod is disposed at each of the upper opposite corners of said sun visor, in order to provide two throttle openings.

3. The sun visor, as set forth in claim 1, wherein said sheet material forms a lip-shaped opening receiving said carrying rod.

4. The sun visor, as set forth in claim 1, which includes a closing cap secured to said sun visor at the point of entrance of said carrying rod and surrounding the latter, and said cap defining jointly with the edge portion of said sheet material an air escape chamber.

References Cited in the file of this patent

UNITED STATES PATENTS

| | | |
|---|---|---|
| 1,898,276 | Van Dresser | Feb. 21, 1933 |
| 2,234,284 | Schoenheit | Mar. 11, 1941 |
| 2,506,889 | Simpson et al. | May 9, 1950 |
| 2,626,163 | Scantlebury | Jan. 20, 1953 |
| 2,757,040 | McLelland | July 31, 1956 |

FOREIGN PATENTS

| | | |
|---|---|---|
| 1,125,997 | France | July 23, 1956 |
| 949,143 | Germany | Sept. 13, 1956 |